(12) United States Patent
Puranik et al.

(10) Patent No.: US 9,131,449 B2
(45) Date of Patent: Sep. 8, 2015

(54) CONTROLLING WIRELESS NETWORK SIGNALS

(71) Applicant: Cellco Partnership, Basking Ridge, NJ (US)

(72) Inventors: Gagan Puranik, Northborough, MA (US); Edward Michael Jack, Ashby, MA (US); Zhou Zheng, Worcester, MA (US)

(73) Assignee: Cellco Partnership, Basking Ridge, NJ (US)

( * ) Notice: Subject to any disclaimer, the term of this patent is extended or adjusted under 35 U.S.C. 154(b) by 555 days.

(21) Appl. No.: 13/628,383

(22) Filed: Sep. 27, 2012

(65) Prior Publication Data

US 2014/0087776 A1    Mar. 27, 2014

(51) Int. Cl.
*H04W 52/04* (2009.01)
*H04W 52/24* (2009.01)

(52) U.S. Cl.
CPC ............ *H04W 52/04* (2013.01); *H04W 52/245* (2013.01)

(58) Field of Classification Search
CPC ..... H04W 16/22; H04W 16/18; H04W 24/08; H04B 17/3911; H04B 17/0087; H04B 17/20; H04B 17/004; H04B 17/0085; H04B 17/101; H04B 17/14; H04B 17/29; H04B 17/391; H04B 17/3912; H04L 41/145; H04L 43/50

USPC ............ 455/423–425, 67.11, 67.3, 67.4, 500, 455/501

See application file for complete search history.

(56) References Cited

U.S. PATENT DOCUMENTS

| | | | |
|---|---|---|---|
| 2005/0055195 A1* | 3/2005 | Hernandez-Mondragon et al. | 703/23 |
| 2005/0085223 A1* | 4/2005 | Liu | 455/423 |
| 2006/0209866 A1* | 9/2006 | Steenkiste et al. | 370/419 |
| 2007/0127559 A1* | 6/2007 | Chang | 375/213 |
| 2007/0243826 A1* | 10/2007 | Liu | 455/67.11 |
| 2008/0085737 A1* | 4/2008 | Kim | 455/558 |
| 2008/0151763 A1* | 6/2008 | Lee et al. | 370/241 |
| 2009/0131044 A1* | 5/2009 | Marini et al. | 455/424 |
| 2011/0003606 A1* | 1/2011 | Forenza et al. | 455/501 |
| 2013/0281100 A1* | 10/2013 | Lanzo et al. | 455/446 |
| 2013/0315216 A1* | 11/2013 | Kangas et al. | 370/336 |

* cited by examiner

*Primary Examiner* — Sujatha Sharma

(57) ABSTRACT

A device may receive, from a browser, a message requesting that a first signal from a first base station of a first wireless network be attenuated in accordance with a first attenuation value. The device may set an attenuation level of the first wireless signal in accordance with the first attenuation value in response to the message. The first signal attenuated by the first attenuation value is wirelessly transmitted to a first user device at a first area shielded from signals wirelessly transmitted to a second user device at a second location.

20 Claims, 15 Drawing Sheets

SUBSCRIBER DETAILS

HOME    SHOW SUBSCRIBERS    [REFRESH]

1002:
SUNDAY AUGUST 26 20:18:54 EDT 2012
USER NAME: 031148000000440@NAI.EPC.MNC480.MCC311.3GPPNOTWORK.ORG
STATUS: ONLINE/ACTIVE

ACCESS TYPE: GTP-PDN-TYPE-IPV6     NETWORK TYPE: IPV6
ACCESS TECH: eUTRAN                ACCESS NETWORK PEER ID: N/A
CALL ID: 368A18F2                  IMEI: 311480000004440
STATUS: CONNECTED                  SGW ADDRESS: 10.161.20.100

CONNECT TIME: THU AUG 23 11:31:57 2012    CALL DURATION: 80H56M27S
IDLE TIME: 00H05M06S                      IDLE TIME LEFT: 00H54M54S

IP ADDRESS: FD01:161:31:35A:0:36:8A18:F301
IP POOL NAME: IMO61-1

---

[LAST 30 SECS VIEW]

1004:
INPUT PKTS DROPPED: 0              OUTPUT PKTS DROPPED: 0
                                   OUTPUT PKTS DROPPED LCRC: 0
INPUT PKTS DROPPED DUE TO LCRC: 0
OUTPUT PKTS DROPPED DUE TO LCRC: 0

---

[LAST 15 MIN VIEW]

1006:
TOTAL SUBSCRIBERS MATCHING SPECIFIED CRITERIA: 1
[LOCAL]LTE-INNOV-HSGW-EGW  SUNDAY  AUGUST 26  20:28:26  EDT 2012

PEAK (Mbps): 450, 300, 150 — 15 MIN. AGO — FROM USER

AVE (Mbps): 150, 100, 50 — 15 MIN. AGO — FROM USER

READ POWER STRIP

STATUS

| OUTLET ID | OUTLET NAME | OUTLET STATUS | CONTROL STATE |
|---|---|---|---|
| .A1 | EDISON | ON | WAKE ON |
| .A3 | DAVINCI | ON | WAKE ON |
| .A4 | FRANKLIN | ON | WAKE ON |
| .A6 | ARCHIMEDES | ON | WAKE ON |
| .A16 | BELL | ON | WAKE ON |

COMMAND SUCCESSFUL

CONTROLLING WIRELESS NETWORK SIGNALS

BACKGROUND INFORMATION

The development of consumer devices (e.g., portable devices, stationary devices, etc.) has given users an expansive platform to access services and exchange information with one another. In turn, users' reliance on these consumer devices and the networks that offer the services and information has comparatively grown in both personal and business settings. As networks continue to provide an ever-expanding variety of services and assets to users, networks and the consumers' devices are optimized and tested under network performance metrics, such as, throughput, signal-to-noise ratio, etc.

BRIEF DESCRIPTION OF THE DRAWINGS

FIG. 10 illustrates a view of the user interface/web pages, displayed by a network device of FIG. 1, that shows detailed subscriber information;

FIG. 14 illustrates a view of the user interface/web pages, displayed by a network device of FIG. 1, for administration of power strips associated with the laboratories of FIG. 1.

DETAILED DESCRIPTION OF PREFERRED EMBODIMENTS

The following detailed description refers to the accompanying drawings. The same reference numbers in different drawings may identify the same or similar elements.

As described below, a system may allow a user to set attenuation levels of signals from base stations of wireless networks, simulate handoffs of a user device between two wireless networks, and obtain information about wireless network subscribers. Accordingly, the system allows the user to test the user device (e.g., a smart phone) under specific network conditions (e.g., signals at specific signal-to-noise ratios).

If a user logs into the system as an administrator, the user may set the default attenuation levels, reset passwords for accessing the system, reset power strips (e.g., power distribution units) that feed into specific locations, and/or reset attenuator ports at the specific locations.

Figure 1:
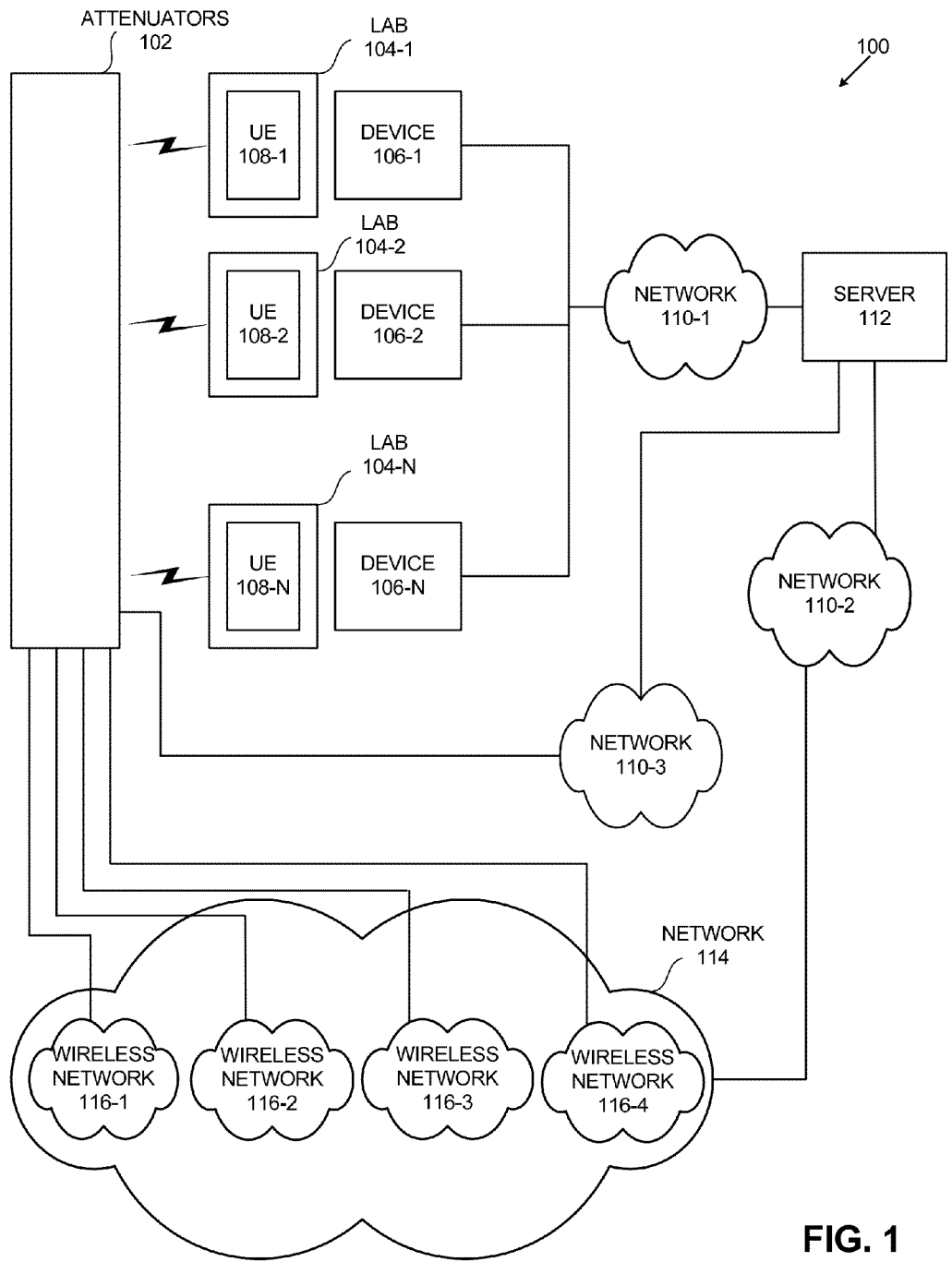
FIG. 1 illustrates an exemplary system in which concepts described herein may be implemented.

FIG. 1 illustrates an exemplary system 100 in which concepts described herein may be implemented. As shown, system 100 may include attenuators 102; laboratories (or rooms) 104-1 to 104-N (collectively "laboratories 104" and individually as "laboratory 104"), which in turn may include user equipment (UE) 108-1 to 108-N (collectively and individually "user equipment 106"); devices 106-1 to 106-M (collectively "devices 106" and individually "device 106"); networks 110-1, 110-2, and 110-3; a server device 112; and a network 114, which may include wireless network 116-1, 116-2, 116-3, and 116-4.

Depending on the implementation, system 100 may include additional, fewer, different, or a different arrangement of devices, components, and networks than those illustrated in FIG. 1. For example, system 100 may include additional networks and/or wireless networks. In some implementations, system 100 may include only one network 110. Furthermore, although not illustrated for simplicity, system 100 may include other network components and/or devices (e.g., routers, switches, bridges, gateways, etc.).

Attenuators 102 may receive signals from base stations of wireless networks 116, attenuate one or more of the received signals to desired levels indicated by server 112, and send the attenuated signals to laboratories 104. In one implementation, attenuators 102 may receive the signals from the base stations via cables, wires, optical fibers, etc., and send the attenuated signals to laboratories via cables, wires, optical fibers, etc.

Attenuators 102 may provide, to each laboratory 104, signal attenuations that are independent from those of other laboratories 104. For example, assume that attenuator 102 receives a signal from a base station in wireless network 116-1, attenuates the signal by 10 dB, and sends the attenuated signal to laboratory 104-1. In such an instance, attenuator 102 may be capable of attenuating the signal from another base station of wireless network 116-1 by a different amount (e.g., 5 dB) at the same time, and sending the attenuated signal from the other base station to laboratory 106-2.

In some implementations, attenuators 102 may include additional computational components (e.g., a microprocessor, a memory, etc.) to store and/or execute instructions received from server device 112. In such an implementation, attenuators 102 may be capable of continually adjusting attenuation levels of signals from various wireless networks 116 in real time and providing the adjusted signals to each laboratory 104. In other implementations, attenuators 102 may be controlled by server device 112 in real time.

Laboratory 104 may include a place, area, location (e.g., a room, an enclosure, etc.) that may receive specified signals via attenuators 102, from base stations, without interference from other wireless signals. Laboratory 104 may receive attenuated signals from different base stations of wireless networks 116. Each laboratory 104 may be shielded from signals feeding into other laboratories 104, such that the laboratory 104 may provide an isolated environment for testing, for example, a communication link between user equipment 108 and wireless networks 116 independently from environmental variables in other laboratories 104.

Each laboratory 104 may receive attenuated signal feeds from each base station of a wireless network 116, e.g., via cable, optical fiber, wires, etc., and transmit the signal to user equipment 108, for example, wirelessly via a transceiver included in laboratory 104. Conversely, each laboratory 104 may receive a wireless signal from user equipment 108 via the transceiver, and route the signal to the base stations via wires, cables, optical fibers, etc. to attenuators 102. Attenuators 102 in turn may send the signals to their corresponding wireless networks 116. For each laboratory 104, a signal from one wireless network 116 may be provided at an attenuation level independently of attenuation levels of signals from other wireless networks 116.

Device 106 may include a computer-like device, such as a personal computer, laptop computer, tablet computer, a server device, a smart phone, a netbook computer, etc. Each device 106 may host a client application or a browser for interacting with a server device 112. Through the client application/browser, a user at device 106 may control different parameters of system 100 or obtain information about system 100. For example, via device 106-1, a user may set attenuation levels of signals from wireless networks 116 as a function of time or reset power strips to laboratory 104-3. A particular device 106 (e.g., device 106-1) does not need to be specifically assigned to a particular laboratory 104 for the device 106 to control the laboratory. Any device 106 with a browser, for example, may set the attenuation levels at any of laboratories 104. In addition, device 106 may be located close to a laboratory 104, within a laboratory 104, or far from a laboratory 104.

A user at device 106 may obtain information about system 100. For example, via device 106, the user may send a query to server device 112 (e.g., via network 110-1), to obtain information about a subscriber of a particular wireless network 116.

User equipment 108 may include a device having the capability to communicate with other devices, systems, networks, etc. A user in laboratory 104 may test different capabilities/functionalities of wireless networks 116, user equipment 108, and/or communication links between wireless networks 116 and user equipment 108.

User equipment 108 may include a wireless telephone, an Internet Protocol (IP) telephone, a computer (e.g., a laptop, a palmtop, a personal computer, a tablet computer, etc.), a personal digital assistant (PDA), a gaming device, a personal communication system (PCS) terminal, a pervasive computing device, a video playing device, a music playing device, a kiosk, and/or some other type of portable device, mobile device, handheld device, stationary device, and/or vehicle-based device. User equipment 108 may operate according to one or more versions of the wireless communication standard/protocol (e.g., long term evolution (LTE) standard, GSM (Global System for Mobile Communications), CDMA (Code-Division Multiple Access), WCDMA (Wideband CDMA), IEEE 802.11x, etc. User equipment 108 may be associated with an identifier (e.g., International Mobile Station Equipment Identity (IMEI), International Mobile Subscriber Identity (IMSI), etc.).

Network 110 may include an intranet. Network 110 may include an IP network, interconnecting devices wirelessly or via cables, optical fibers, etc. Network 110 may be secure and may include devices for firewalls, gateways, authentication, policy enforcement, etc.

Server device 112 may host a web server, application server, and/or other types of applications and/or programs. Server device 112 may receive, from device 106, requests to set attenuation levels at attenuator 102, for signals that are feeding into attenuators 102 from base stations of wireless networks 116. In addition, server device 112 may obtain, upon receiving a request from device 106, information about one or more subscribers from wireless network 116, and provide the information to device 106. Server device 112 may be capable of performing other functions, such as administrator privileged functions (e.g., set password for each of the laboratories 104, reset power strips in laboratories 104, set the default attenuation levels, etc.).

In some implementations, server device 112 may control attenuators 102 in real time (e.g., by communicating with attenuators 102 over network 110-3). In other implementations, attenuators 102 may include control components, such that attenuators 102 are capable of following instructions from server device 112 on how and when to attenuate signals from base stations of wireless networks 116 (e.g., instruct attenuators 102 to change signal strength as a function of time).

Network 114 may include a wired or wireless network via which devices communicate (e.g., a fiber-optic network, a local area network (LAN), a wide area network (WAN), a wireless LAN, a metropolitan area network (MAN), a cellular network, a public switched telephone network (PSTN), an intranet, the Internet, a satellite-based network, any other network, or a combination of networks).

Wireless network 116 may include an LTE network, GSM network, a Universal Mobile Telecommunication System (UMTS) network, a WCDMA network, an Ultra Mobile Broadband (UMB) network, a High-Speed Packet Access (HSPA) network, a Worldwide Interoperability for Microwave Access (WiMAX) network, an Institute of Electrical and Electronics Engineers (IEEE) 802.X network, and/or another type of wireless network (e.g., an ad hoc network, etc.), or another type of cellular network.

Figure 2:
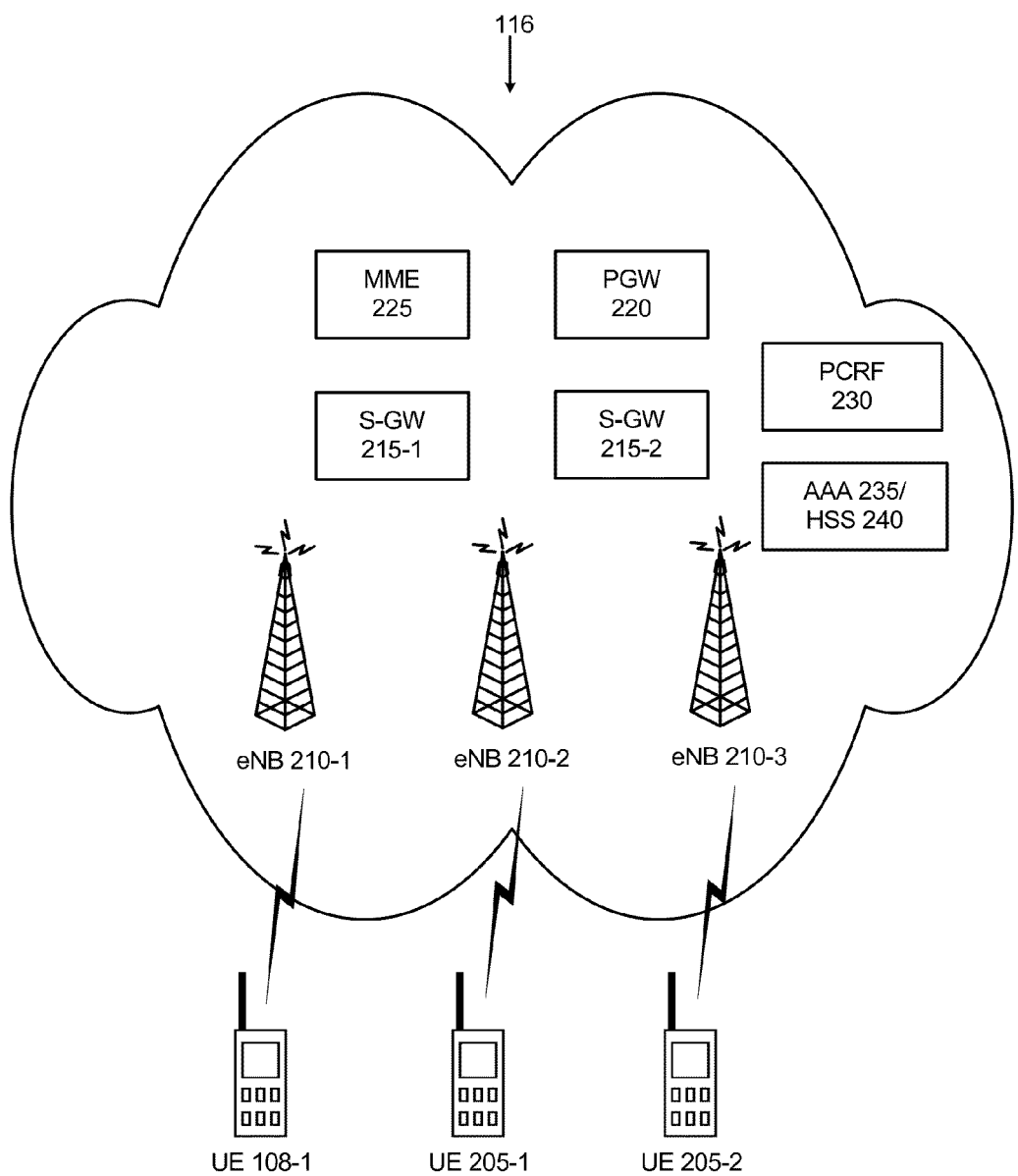
FIG. 2 is a diagram of exemplary devices and/or components of a wireless network of FIG. 1.

FIG. 2 is a diagram of exemplary devices and/or components of wireless network 116 according to one implementation. In this implementation, wireless network 116 is illustrated as an LTE network. As illustrated, network 116 may include UEs 108-1 through 205-2 (collectively referred to as "UEs 205" or individually as "UE 205"), eNBs 210-1 through 210-3 (collectively referred to as "eNBs 210" or individually as "eNB 210"), S-GWs 215-1 and 215-2 (collectively referred to as "S-GWs 215" or individually as "S-GW 115"), PGW 220, mobility management entity (MME) 225, policy and charging rules function (PCRF) device 230, and authentication, authorization, and accounting (AAA) servers 235/home subscriber server (HSS) 240.

The number of devices and configuration in wireless network 116 is exemplary and provided for simplicity. In practice, wireless network 116 may include more devices, fewer devices, different devices, and/or differently arranged devices than those illustrated in FIG. 2. For example, wireless network 116 may include a relay node, a repeater, a UE-GW, a home eNB, a home eNB-GW, a security gateway (SecGW), etc. Additionally, or alternatively, wireless network 116 may include additional network. Also, some functions described as being performed by a particular device may be performed by a different device or a combination of devices. Additionally, or alternatively, although FIG. 2 illustrates separate instances of MME 225, PGW 220, S-GW 215, etc., in other implementations, two or more of these devices may be combined. For example, MME 225 may be combined with S-GW 215, or PGW 220 may be combined with S-GW 215, PCRF device 230 may be combined with PGW 220, etc. Wireless network 116 may include wired and/or wireless connections among the devices illustrated.

UE 205 may include a device having the capability to communicate with other devices, systems, networks, and/or the like. UE 205 may operate according to one or more versions of the LTE communication standard.

ENB 210, S-GW 215, PGW 220, and MME 225 may include network devices or entities that operate according to one or more versions of the LTE communication standard. According to an exemplary implementation of the LTE communication standard, S-GW 215, PGW 220, and MME 225 may form an Evolved Packet Core (EPC) network.

PCRF device 230 may include a device that managed bandwidth, charging rates, and policies. AAA server 235 may include a device that provided authentication, authorization, and accounting services. HSS 240 may include a device that provided subscriber data storage for subscription-related information (e.g., subscriber profiles, etc.). HSS 240 may also provide other services (e.g., authentication, authorization, etc.).

In one implementation, any of devices S-GW 216, PGW 220, MME 225, PCRF device 230, AAA server 235, and HSS 240 may communicate with server device 112. Upon receipt of a request from server device S-GW 215, PGW 220, MME 225, PCRF device 230, AAA server 235, and HSS 240 may provide information and/or a service/function to device 112 (e.g., provide information about a subscriber to server device 112).

Figure 3:
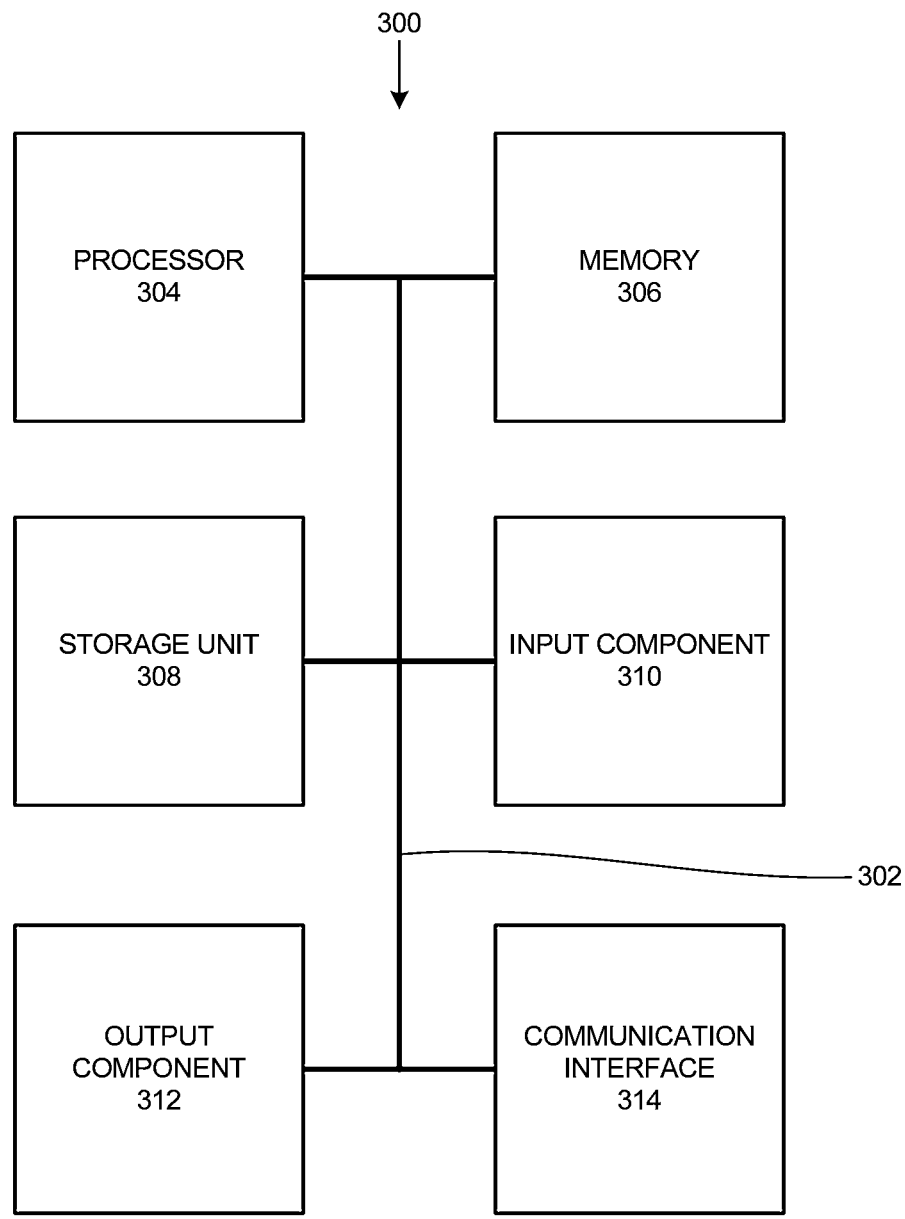
FIG. 3 a block diagram of exemplary components of a network device of FIG. 1.

FIG. 3 a block diagram of exemplary components of network device 200 of FIG. 1 and/or FIG. 2 according to one implementation. Network device 200 may represent (or correspond to) any one of device 106, UE 108, server device 112, UE 205, eNB 210, S-GW 215, MME 225, PGW 220, PCRF 230, AAA 235, and HSS 240. Referring to FIG. 3, network device 300 may include bus 302, processor 304, memory 306, storage unit 308, input component 310, output component 312, and communication interface 314. Bus 302 may include a path that permits communication among the elements of network device 300.

Processor 304 may include a processor, a microprocessor, an Application Specific Integrated Circuit (ASIC), a Field Programmable Gate Array (FPGA), and/or other processing logic (e.g., embedded devices) capable of controlling network device 300, processing data (e.g., incoming frames, etc.). Memory 306 may include static memory, such as read only memory (ROM), and/or dynamic memory, such as random access memory (RAM) and content addressable memory (CAM), or onboard cache, for storing data and machine-readable instructions (e.g., programs, scripts, etc.).

Storage unit 308 may include a floppy disk, CD ROM, CD read/write (R/W) disc, and/or flash memory, as well as other types of storage devices (e.g., hard disk drive) for storing data and/or machine-readable instructions (e.g., a program, script, etc.). Depending on the context, the term "memory," "storage," "media," "storage device," and/or "storage unit" may be used interchangeably. For example, a "computer-readable storage device" or "computer readable medium" may refer to a memory and/or storage device.

Input component 310 may permit a user to input information to network device 300. Input component 310 may include, for example, a keyboard, a keypad, a mouse, a pen, a microphone, a touch screen, voice recognition and/or biometric mechanisms, etc. Output component 312 may include a mechanism that outputs information to the user. Output component 312 may include, for example, a display, a printer, a speaker, etc. In some implementations, because network device 300 may operate as a server device, network device 300 may include a minimal number of input components 310 and output components 312 (e.g., a keyboard and/or a console), to minimize cost and to increase robustness.

Communication interface 314 may include a transceiver (e.g., a transmitter or receiver) for network device 300 to communicate with other devices and/or systems. For example, via communication interface 314, network device 300 may communicate over a network, such as the Internet, an intranet, a terrestrial wireless network (e.g., a WLAN, WiFi, WiMax, etc.), a satellite-based network, optical network, etc. Communication interface 314 may also include a modem, an Ethernet interface to a LAN, and/or another interface.

Network device 300 may perform the operations described herein in response to processor 304 executing software instructions stored in a non-transient computer-readable medium, such as memory 306. A computer-readable medium may include a physical or logical memory device. The software instructions may be read into memory 306 from another computer-readable medium or from another device via network interface 314. The software instructions stored in memory 306 may cause processor 304 to perform processes that are described herein.

Figure 4:
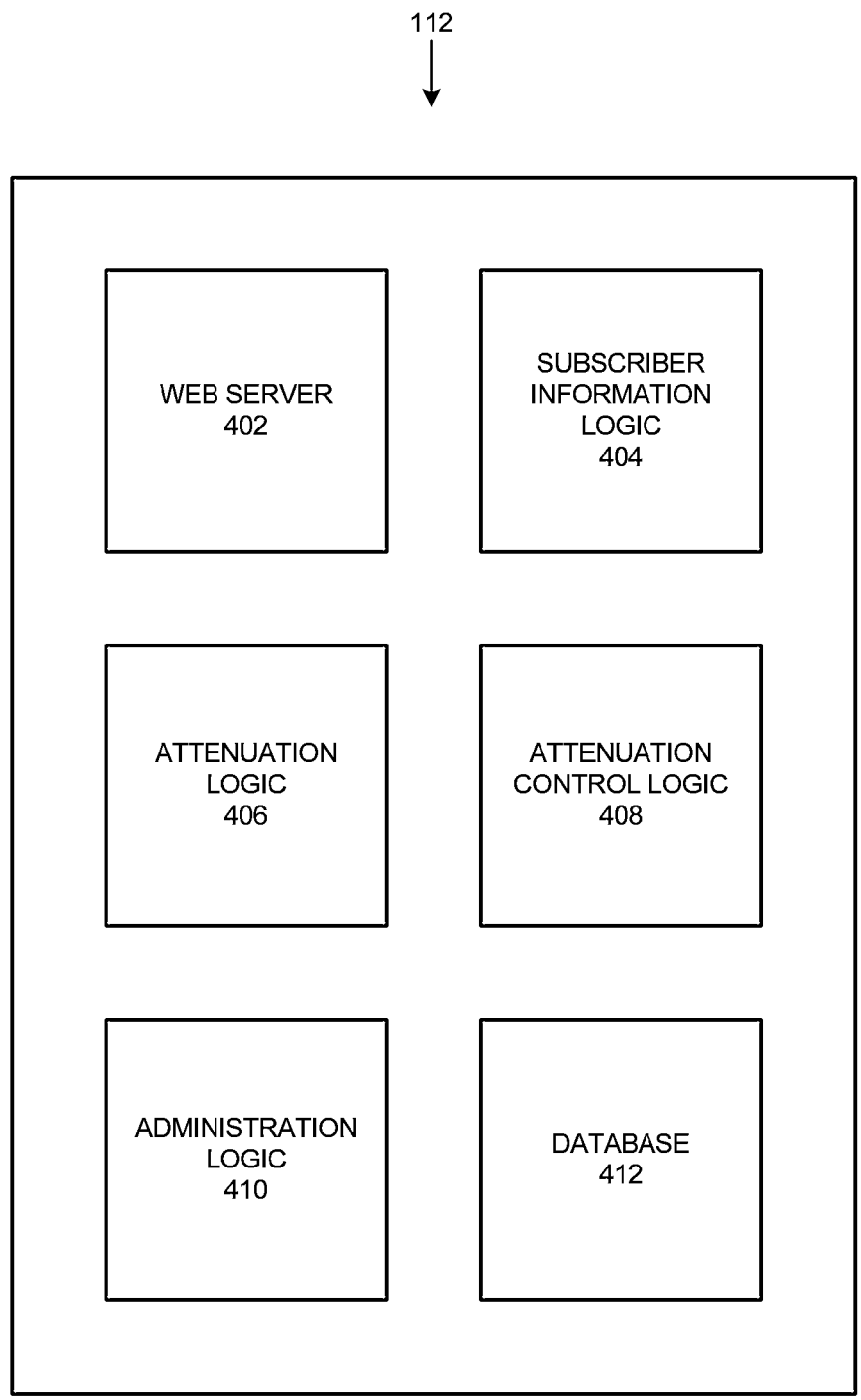
FIG. 4 is a block diagram of exemplary functional components of the server device of FIG. 1.

FIG. 4 is a block diagram of exemplary functional components of server device 112 of FIG. 1. As shown, server device 112 may include a web server 402, subscription information logic 404, attenuation logic 406, attenuation control logic 408, administration logic 410, and database 412. Depending on the implementation, server device 112 may include additional, fewer, different, or a different arrangement of components than those illustrated in FIG. 4. For example, in one implementation, server device 112 may include an application server. Although not illustrated in FIG. 4, server device 112 may include other functional components, such as an operating system, device drivers, etc.

Web server 402 may receive requests from device 106 to obtain subscriber information, control attenuator 102, and/or perform administration functions. Upon obtaining subscriber information, web server 402 may forward the information to device 106, which in turn may display the information via a browser.

Subscriber information logic 404 may obtain information, on behalf of web server 402 about wireless network subscribers from one or more devices in wireless network 116 and provide the information to web server 402. Web server 402 may relay the information to the requesting browser. The information may indicate how long a particular subscriber has been connected to a particular wireless network, a communication link's peak or average bit rate, etc.

Attenuation logic 406 may provide attenuation related options, via web server 402, to a browser and receive input from the browser. Upon receipt of the input, attenuation logic 406 may drive attenuation control logic 408 to perform a specific function.

Attenuation control logic 408 may control attenuator 102. For example, attenuation control logic 408 may set the attenuation level of a signal that feeds into laboratory 104 from a base station of particular wireless network 116. In another example, attenuation control logic 408 may continuously set the attenuation level of a signal, as a function of time, for emulating handover conditions. In some implementations, attenuation control logic 408 may not be included in server device 112, but in attenuators 102. In such an implementation, attenuation logic 406 and attenuation control logic 408 may communicate with one another over network 112-3.

Administration logic 410 may perform administrator functions. When web server 402 receives a request to perform an administration function (e.g., reset a password), web server 402 may cause/invoke administrator logic 410 to perform the function. Administration logic 410 may reset passwords for accessing pages to control attenuation levels at different laboratories 104, reset power strips in laboratories 104, and/or set default attenuation levels for different signals for each of laboratories 104.

Database 412 may store information about subscribers, scheduled attenuation control instructions, and/or other information (e.g., user IDs, passwords, etc.) for web server 402, subscriber information logic 404, and/or attenuation control logic 408 to perform their functions. For example, database 412 may cache information about subscribers. In these situations, subscriber information logic 404 may obtain subscriber information from database 412 rather than from a device in wireless network 116. Subscriber information logic 404, attenuation logic 406, attenuation control logic 408, and/or administration logic 410 may store information in or obtain information from database 412.

Figure 5:
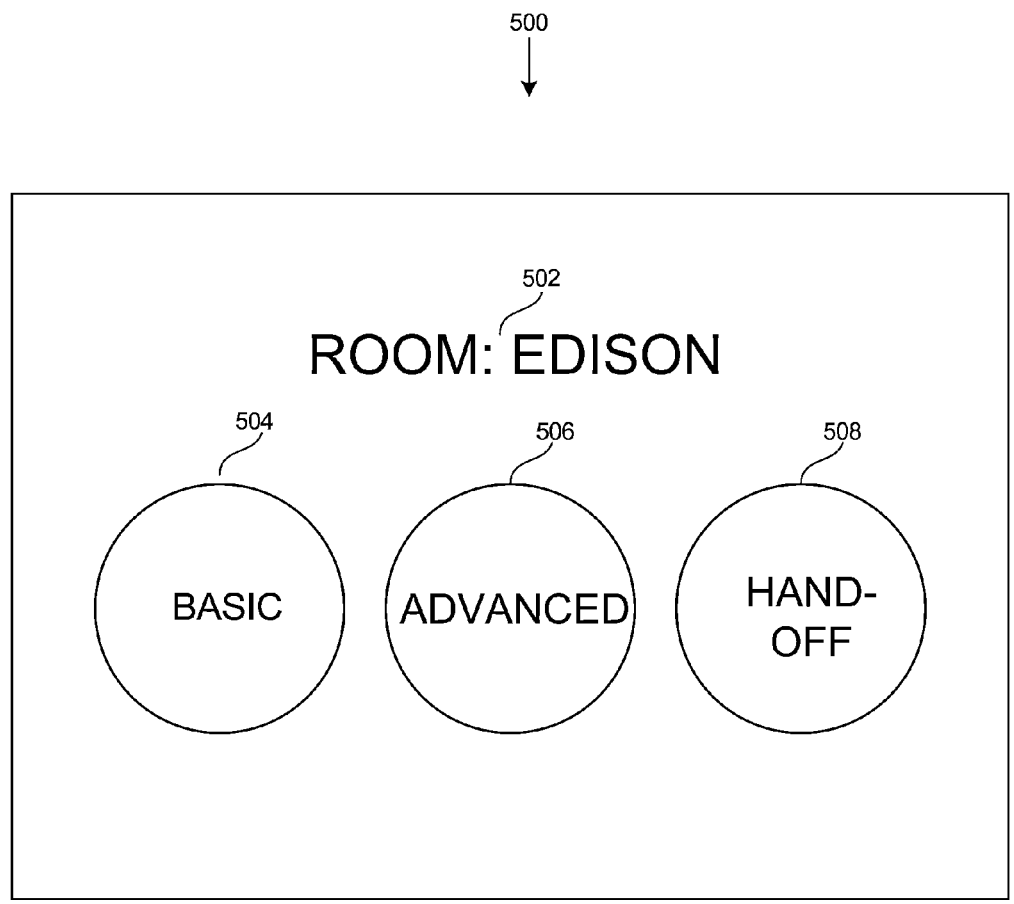
FIG. 5 illustrates a view of an exemplary user interface or web pages displayed by a network device of FIG. 1.

FIG. 5 illustrates a view of an exemplary user interface or web pages displayed by device 106. Although the user interface may be implemented in many ways, in FIG. 5, the user interface is assumed to be implemented as web pages. Once a user logs onto web server 402 on server device 112, the user may be shown (e.g., by web server 402, the browser, and/or attenuation logic 406) a web page 500 that allows the user to access other web pages for controlling signal attenuations at a particular laboratory 104. As shown, web page 500 may include a laboratory name 502 and mode selection buttons 504-508.

Laboratory name 502 may identify the laboratory 104 for which the user may access attenuation control functions. One of mode selection buttons 504-508 may activated by a user to select the mode in which the user accesses attenuation control functions. When a user activates one of buttons 504-508 (e.g., click on button 504 with a mouse), web server 402 may provide a page (e.g., via attenuation logic 406) that corresponds to the activated button, for controlling attenuations of signals feeding into the laboratory identified by laboratory name 502. As shown, mode selection buttons 504-508 may include a basic mode button 504, an advanced mode button 506, and a handoff mode button 508, for directing the browser to a page for controlling attenuator settings for the laboratory in the basic mode, advanced mode, and handoff mode, respectively. In the basic mode, web server 402 (in conjunction with attenuation logic 406 and attenuation control logic 408) may allow the user to set an attenuation level of a signal from a base station of a wireless network 116. In the advanced mode, web server 402 may allow the user to set attenuation levels of multiple signals from different base stations associated with wireless networks 116. The base stations may be part of the same or different wireless networks 116. In the hand off mode, web server 402 may allow the user to emulate attenuations of signals from base stations as functions of time.

Figure 6:
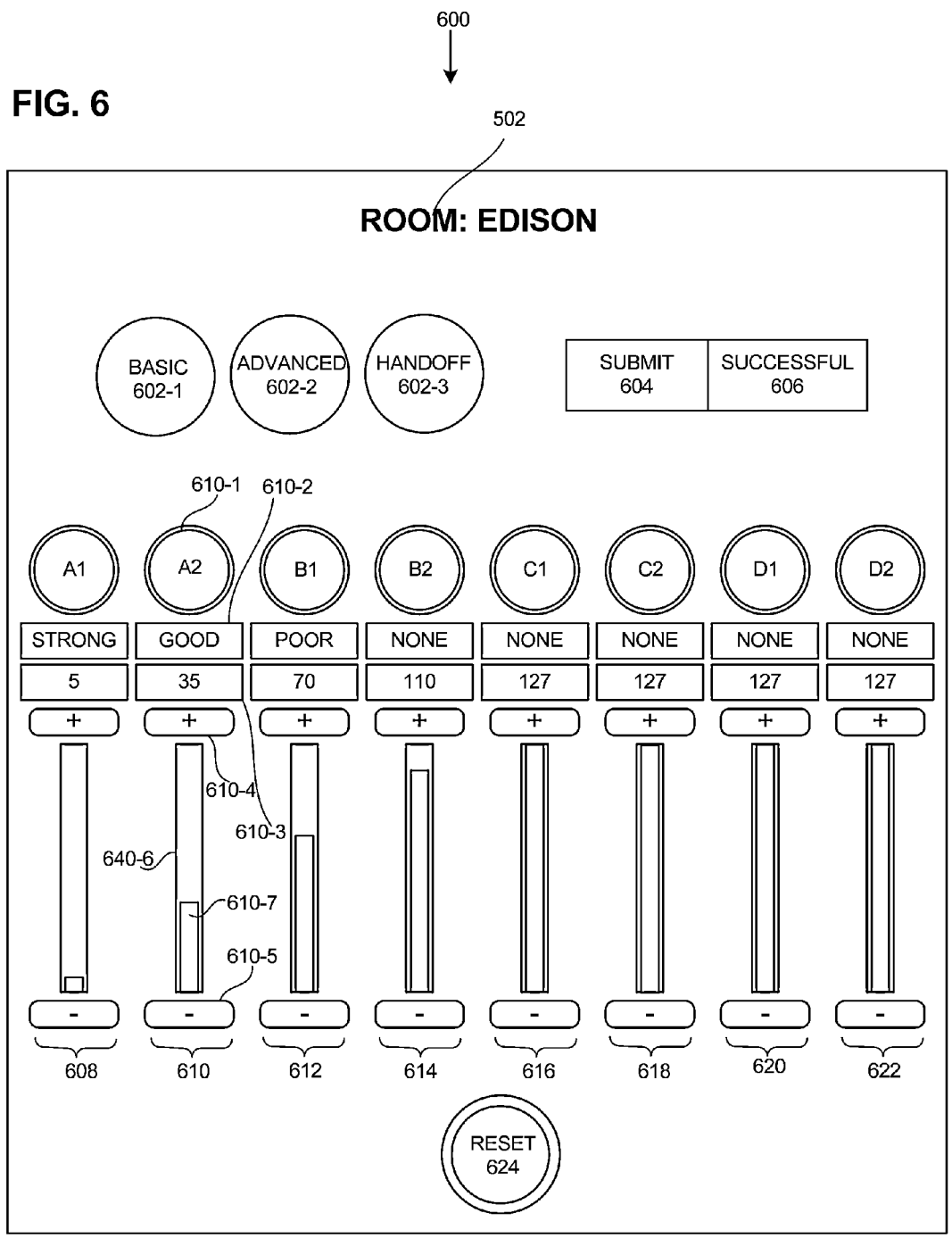
FIG. 6 illustrates a view of the user interface/web pages displayed by a network device of FIG. 1 under the advanced settings option.

FIG. 6 illustrates a view of the user interface/web pages displayed by device 106 under the advanced settings option. As shown, web page 600 may include laboratory name 502, mode indicator buttons 602-1 through 602-3, submit button 604, submission result button 606, attenuation level setting columns 608 through 622, and reset button 624. Depending on the implementation, web page 600 may include additional, fewer, different, or a different arrangement of components than those illustrated in FIG. 6.

Mode indicator buttons 602-1 through 602-3 may indicate the mode associated with page 600. In FIG. 6, the advanced mode button 602-2 is colored lighter than other buttons 602-1 and 602-3, indicating that web page 600 is for setting parameters in the advanced mode.

Submit button 604, when activated, causes the browser to send parameter values set by the user at web page 600, at device 106, to server device 112. Server device 112 may receive the set values and set attenuator 102 (e.g., via attenuation logic 406 and attenuation control logic 408) in accordance with the received values. When server device 112 sets the values, server device 112 may notify device 106 whether attenuator 102 has been successfully configured in accordance with the values.

Result button 606 may indicate whether server device 112 has successfully configured attenuator 102. For example, when server device 112 receives a message from attenuator 102 that a requested attenuation of a signal from a base station of wireless network 116 to laboratory 104 has been set to a particular value, server device 112 may send a message to the browser. In response, the browser may change the color of result button 606 to indicate, to the user, that the attenuator 102 setting has been changed.

Each of attenuation level setting columns 608-622 may receive user input for setting and displaying the attenuation level of a signal from a particular base station of a wireless network. As further shown in FIG. 6, attenuation level setting column 610 may include a network identifier icon 610-1, a signal strength indicator 610-2, an attenuation level indicator 610-3, an attenuation adder 610-4, an attenuation reducer 610-5, an attenuation meter 610-6, and an attenuation bar 610-7. For simplicity, similar components of other columns 608 and 612-622 are not labeled in FIG. 6.

Network identifier icon 610-1 may identify a base station/wireless network whose signal attenuation level is set via and/or displayed by attenuation level setting column 610. In some implementations, the color of network identifier icon 610-1 may indicate whether the attenuation level is different from the default value (e.g., 127 dB). In FIG. 6, the network identifier icons for columns 608-614 are lighter than the corresponding icons for columns 616-622, to indicate the signals to the EDISON room from the base stations corresponding to columns 608-614 are different from the default values.

Signal strength indicator 610-2 may indicate the strength of the signal through attenuator 102 from the base station corresponding to column 610. (e.g., one of "STRONG," "GOOD," "POOR" or "NONE"). In FIG. 6, signal strength indicator 610-2 shows "GOOD."

Attenuation level indicator 610-3 may indicate, in dB, the desired or set level of attention to be or already applied to signals from the base station corresponding to column 610. In FIG. 3, attenuation level indicator 610-3 shows 35 dB.

Attenuation level adder 610-4 and attenuation reducer 610-5, when activated, may allow a user to increase and decrease, respectively, the desired level of attenuation displayed by attenuation level indicator 610-3 and attenuation bar 610-7.

Attenuation meter 610-6 includes attenuation bar 610-7. The size of attenuation bar 610-7 relative to attenuation meter 610-6 may indicate the extent of attenuation applied to the signal, relative to the default attenuation level.

Reset button 624 may perform the following: reset the value of attenuation level indicator 610-3 to the default value; and reset the size of attenuation bar 610-7 to the size corresponding to the default attenuation value.

In FIG. 6, after a user sets attenuations for wireless signals from particular base stations of wireless networks via one or more of columns 608-622, the user may activate submit button 604. In response, the browser may send a request to server device 112 to set the attenuations for the signals.

Figure 7:
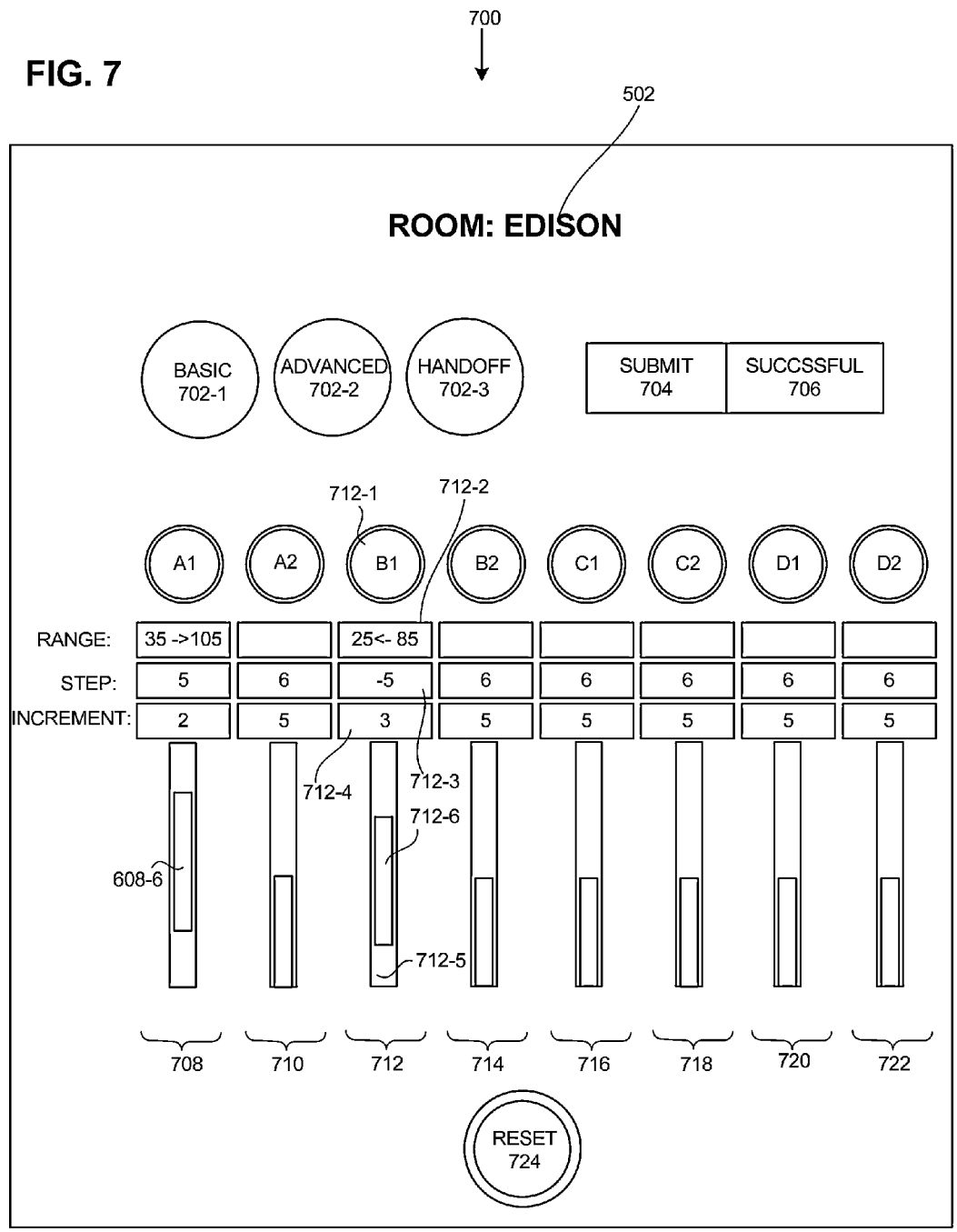
FIG. 7 illustrates a view of the user interface/web pages displayed by a network device of FIG. 1 under the handoff option.

FIG. 7 illustrates a view of the user interface/web pages displayed by device 106 under the handoff option. Via web page 700, a user may select options for emulating a handoff. In a handoff, user equipment moves away from a first base station toward a second base station. As the user equipment travels, the signal between the first base station and the user equipment weakens, and the signal between the second base station and the user equipment increases. Emulation of a handoff entails increasing the attenuation of a signal between user equipment 108 and a base station of wireless network 116 and decreasing the attenuation of another signal between the user equipment and another base station of another or the same wireless network 116.

As shown, web page 700 may include a laboratory name 502, mode indicator buttons 702-1 through 702-3, submit button 704, submission result button 706, attenuation level setting columns 708 through 722, and reset button 724. Depending on the implementation, web page 700 may include additional, fewer, different, or a different arrangement of components than those illustrated in FIG. 7.

Mode indicator buttons 702-1 through 702-3 may indicate the mode associated with page 700. In FIG. 7, the handoff mode button 702-3 is colored lighter than other buttons 702-1 and 702-2, indicating that web page 700 is for controlling the emulation of wireless signals in a handoff scenario.

Submit button 704, when activated, causes the browser to send parameter values set by the user at web page 700, at device 106, to server device 112; and causes the browser to request that server device 112 initiate an emulation of a handoff. Depending on the implementation, upon receipt of the request, server device 112 may control attenuator 102 real time to emulate handoff signaling, or merely relay the request to attenuator 102. When server device 112 sets the values and initiates the emulation (or causes attenuator 102 to initiate the emulation), server device 112 may notify device 106.

Result button 706 may indicate whether server device 112 has successfully configured attenuator 102 in accordance with the attenuation values indicated in FIG. 7 and successfully initiated emulation of a handoff. The browser may change the color of result button 706, to the user, that the emulation has begun. Furthermore, the browser may display changing attenuation levels of the signals from wireless networks, as described below with reference to FIG. 8.

Each of attenuation level setting columns 708 through 722 may receive user input for setting and displaying the starting and the end attenuation levels that are associated with the start and the end of a handoff. As further shown in FIG. 7, attenuation level setting column 712 may include a network identifier icon 712-1, a start and end attenuation level indicator 712-2, a step size indicator 712-3, a time increment indicator 712-4, an attenuation meter 712-5, and an attenuation bar 712-6. For simplicity, similar components of other columns 708, 710, and 714-722 are not labeled in FIG. 7.

Network identifier icon 712-1 may identify a base station and/or a wireless network whose signal attenuation level is increased and/or decreased in accordance with the settings at attenuation level setting column 712. In some implementations, the color of network identifier icons 712-1 may indicate whether the desired attenuation levels have been modified. In FIG. 7, the network identifier icons for columns 708 and 712 are lighter than the corresponding icons for columns 710 and 714-722, to indicate that a handoff settings for columns 708 and 712 have been changed.

Start and end attenuation level indicator 712-2 may indicate the start attenuation and the end attenuation levels. The direction of an arrow in start and end attenuation level indicator 712-2, together with the start/end attenuation values, shows whether the attenuation may decrease or increase as a function of time when attenuator 102 and/or server 112 emulate a handoff. For example, start and end attenuation level indicator 712-2 shows "25<-85," indicating that, in a handoff, the starting attenuation level for the base station associated with column 712 is 85 dB and may decrease to 25 dB. In the handoff, strength of the signal from the base station/wireless network associated with column 712 increases with diminishing attenuation of the signal. In contrast, start and end attenuation level indicator for the base station associated with column shows "35->105," indicating that, in the handoff, the starting attenuation level for the base station is 35 dB and may increase to 105 dB. In the handoff, strength of the signal from the base station associated with column 708 decreases with increasing attenuation of the signal.

Step size indicator 712-3 shows the amount by which attenuation changes each time attenuation level is set during the emulation. Time increment indicator 712-4 shows how frequently the attenuation changes (e.g., every 2 minutes) during the emulation.

Attenuation meter 712-5 includes attenuation bar 712-6. The top and the bottom of attenuation bar 712-6 within attenuation meter 712-5 correspond to the starting/ending and ending/starting values of the attenuation displayed by start and end attenuation level indicator 712-2.

Reset button 724, when activated, may reset start and end attenuation level indicator 712-2 to a default value and reset the size and/or the location of attenuation bar 710-6 to the size and the location corresponding to the default starting and ending attenuation values.

Figure 8:
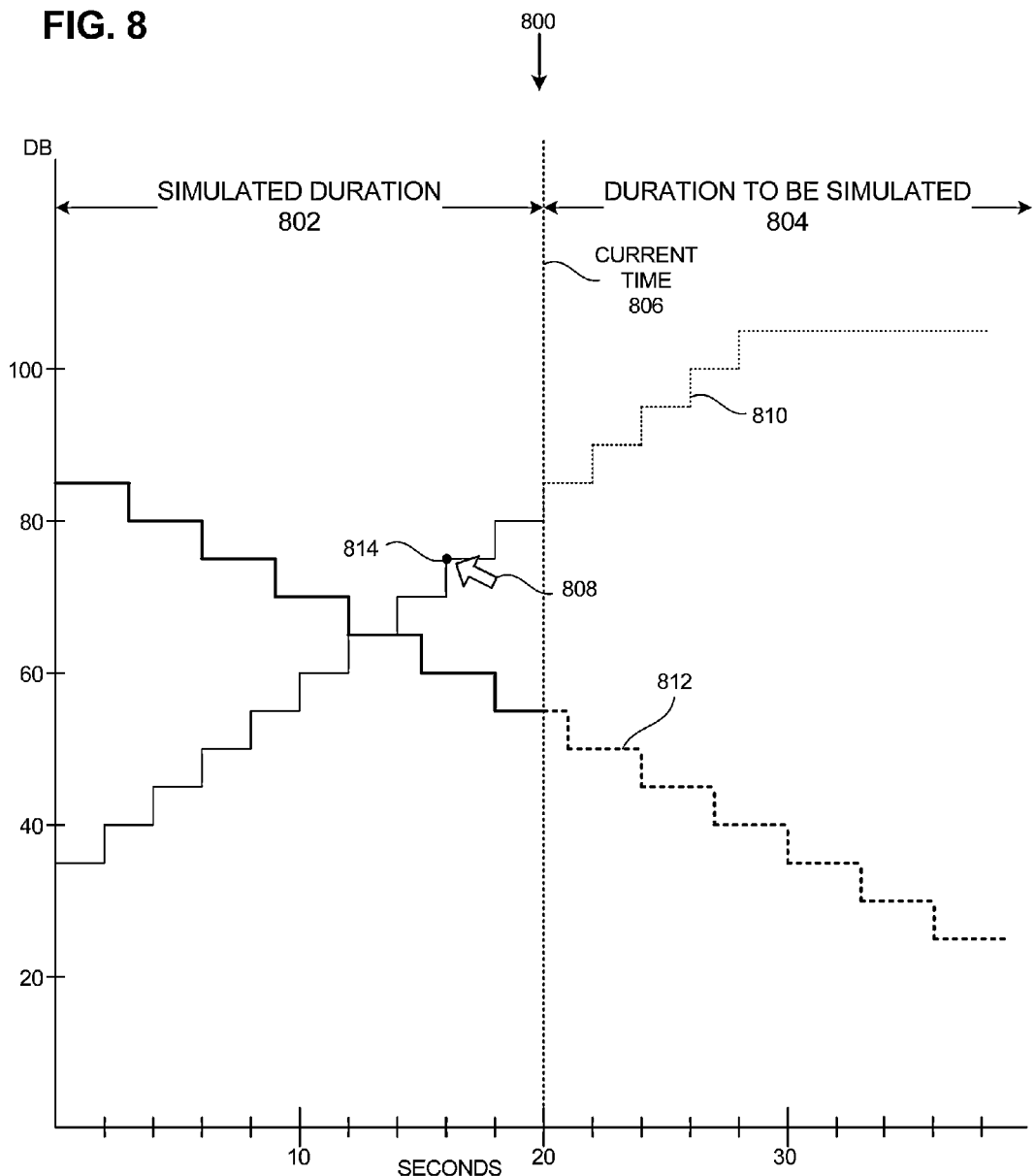
FIG. 8 illustrates another view of the user interface/web pages displayed by a network device of FIG. 1 during an emulation of handoff.

FIG. 8 illustrates a view of the user interface/web pages displayed by device 106 during an emulation of handoff. The browser on device 106 may show web page 800 and update web page 800 as the emulation of handoff progresses. During the emulation, web page 800 may plot attenuation levels of signals from at least two base stations of wireless network, as curves 810 and 812. As the current time advances, a line representing the current time 806 advances in the graph to the right. In the area represented as the simulated duration 802, curves 810 and 812 are shown in solid lines and in the area represented as the duration to be simulated, curves 810 and 812 are shown in dotted lines.

On page 800, curve 810 corresponds to the attenuation level, as a function of time, associated with the base station corresponding to column 708, and curve 812 corresponds to the attenuation level, as a function of time, associated with the base station corresponding to column 712. The actual handoff from one base station to another would occur near the intersection of curves 810 and 812.

Start button 820, pause button 822, and stop button 824 may control the progress of the emulation. Activating start button 820 may restart the emulation; activating pause button 822 may suspend the emulation; and activating stop button 824 may end the emulation.

In some implementations, web page 800 may allow a user to point to any portion of curve 810 or 812 via a cursor 808. When cursor 808 is near a point on a curve (e.g., point 814 on curve 810), cursor 808 may trigger a "tooltip," and cause the browser to show the attenuation level (e.g., in terms of dB) corresponding to the location of cursor 808 on curve 810.

Depending on the implementation, web page 800 may illustrate additional, fewer, different, or a different arrangement of curves and/or components than those illustrated in FIG. 8.

Figure 9:
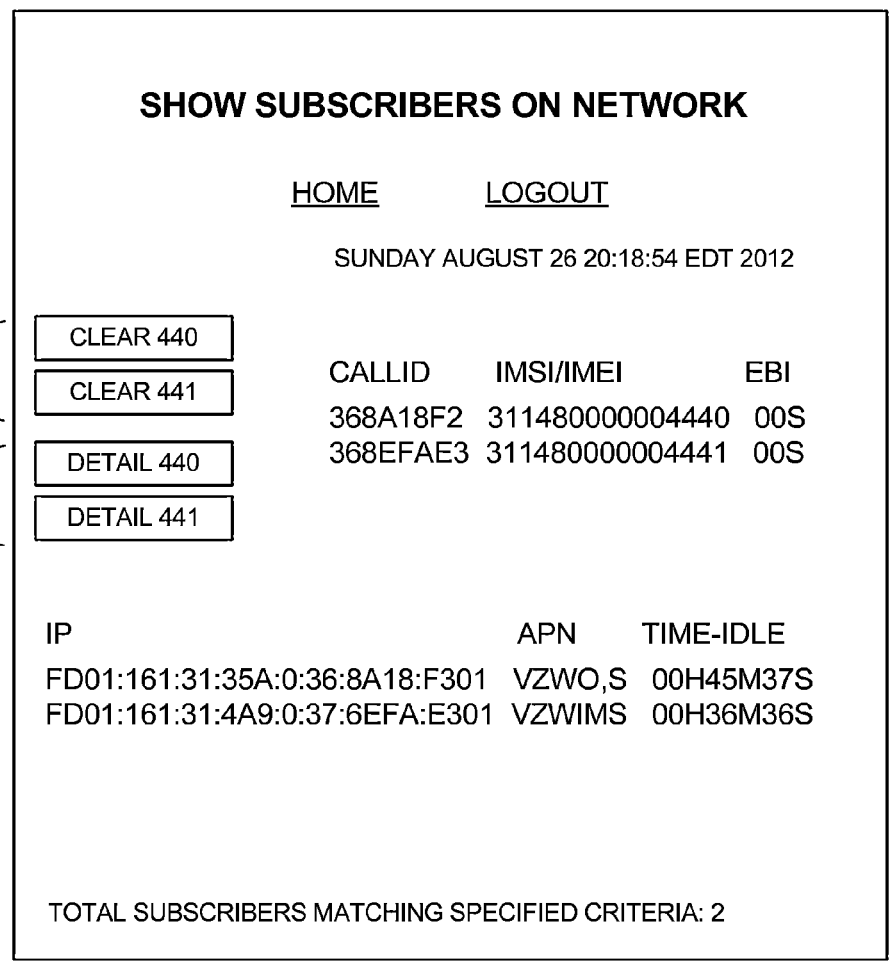
FIG. 9 illustrates a view of the user interface/web pages, displayed by a network device of FIG. 1, that shows subscriber information.

FIG. 9 illustrates a view of the user interface/web pages, displayed by device 106, that shows subscriber information. The browser at device 106 may show web page 900 as a result of the user requesting subscriber information from server device 112. Server device 112 may obtain the subscriber information from a device in wireless network 116 (e.g., PGW 220, MME 225, S-GW 215, etc.) and provide the information to the browser. As shown, web page 900 may include call IDs, IMSI or IMEI, identifiers for base station (EBI), duration for which a subscriber has been idle, an IP address associated with a subscriber, access point name (APN), etc. In addition, web page 900 may include additional components, such as clear buttons 902 and detail buttons 904. In FIG. 9, each of clear buttons 902 and detail buttons 904 may pertain to a particular subscriber. For example activating one of clear buttons 902 (e.g., clear 440) may detach an IMSI on PGW 220 in wireless network 116 for a given subscriber. In another example, activating one of detail buttons 904 (e.g., detail 440) may cause the browser to request server device 112 to provide detailed information about a subscriber. Server device 112, in response to the request, may obtain the information and send the information to the browser to be displayed.

FIG. 10 illustrates a view of the user interface/web pages, displayed by device 106, that shows detailed subscriber information. As shown, web page 1000 may include detailed information section 1002, short-term statistics section 1004, and mid-term statistics section 1006. Depending on the information, web page 1000 may include additional, fewer, different or a different arrangement of sections/components than those illustrated in FIG. 10.

Detailed information section 1002 may include not only the information displayed for one of the subscribers listed on page 900 (FIG. 9), but additional information, such as an identifier associated with S-GW 215 of the wireless network 116, a call duration, the subscriber activity status (e.g., connected, active or not, etc.), the network type (e.g., IPv4 or IPv6), etc.

Short-term statistics section 1004 may include short term statistics, such as the number of packets dropped within the immediate past (e.g., within last 15 minutes). Depending on the implementation, short-term statistics section 1004 may include other types of data.

Mid-term statistics section 1006 may include mid-term statistics, such as the data rate between the subscriber and wireless network 116. In FIG. 10, web page 1000 shows graphs of the peak bit rates and average bit rates (e.g., in Mega bits per second (Mbps)) for the last 15 minutes.

Figure 11:
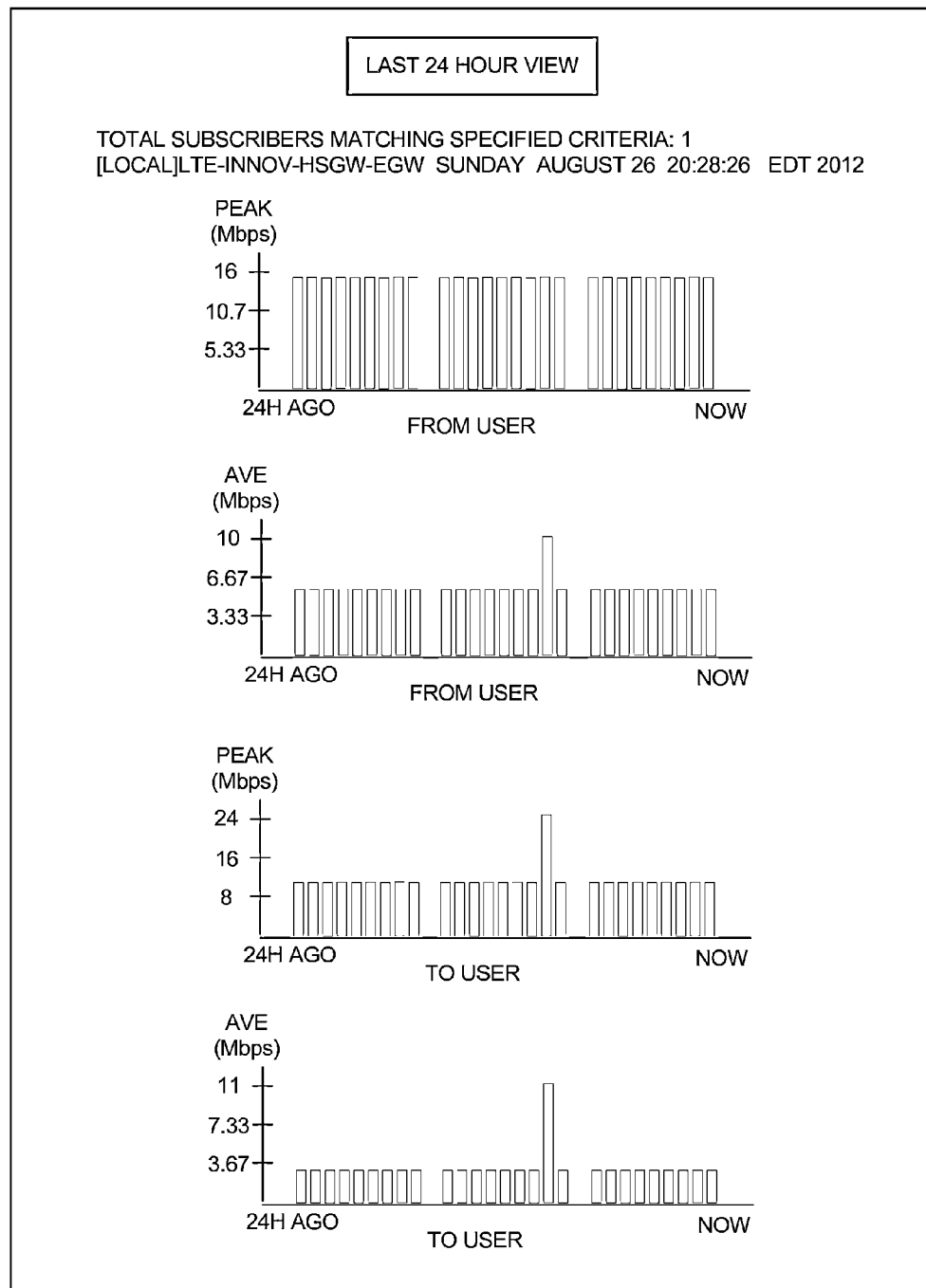
FIG. 11 illustrates a view of the user interface/web pages, displayed by a network device of FIG. 1, that shows additional detailed information.

FIG. 11 illustrates a view of the user interface/web pages, displayed by device 106, that shows additional detailed subscriber information. Depending on the implementation, web page 1100 may be part of web page 1000, or alternatively, may be another web page that is linked from web page 1000.

As shown, web page 1100 shows information about a subscriber for the last 24 hours, in the form of graphs. More specifically, web page 1100 illustrates graphs of peak and average data rates from a subscriber to a wireless network 116, as well as graphs of peak and average data rates from the wireless network 116 to the subscriber, for the last 24 hours.

Figure 12:
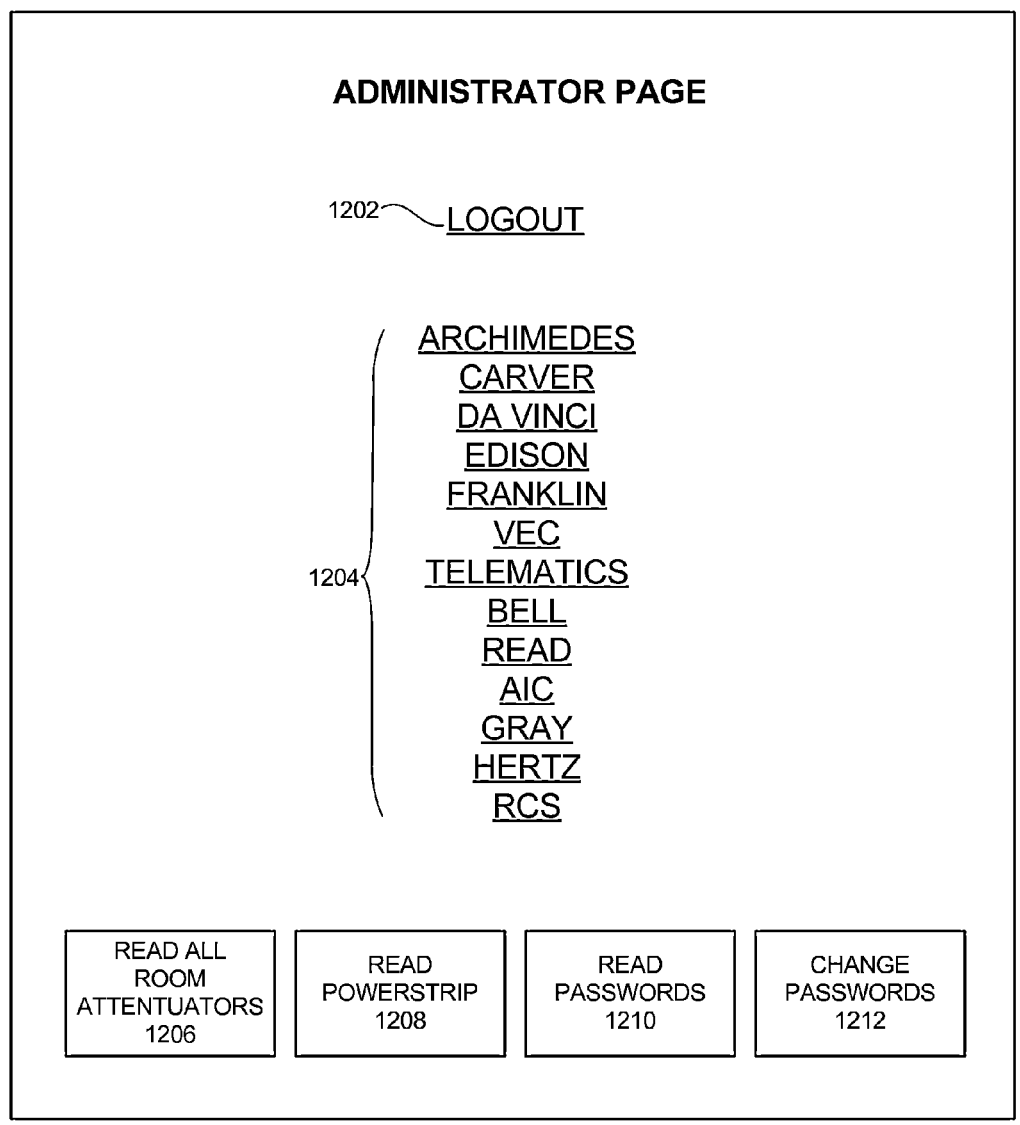
FIG. 12 illustrates a view of the user interface/web pages, displayed by a network device of FIG. 1, for administration of the system of FIG. 1.

FIG. 12 illustrates a view of a user interface/web pages, displayed by device 106, for administration of system 100. As shown, administrator page 1200 may include a logout link 1202, laboratory links 1204, and buttons 1206-1212 for accessing specific administrator functions. Depending on the implementation, administrator page 1200 may include additional, fewer, different, or a different arrangement of components and/or links than those illustrated in FIG. 12.

Logout link 1202 may allow a user to log out from administrator page 1200. Laboratory links 1204 may allow the user to access a web page for controlling attenuations for each laboratory 104 (e.g., web page 500).

Button 1206 may allow the user to access and/or modify certain parameters that are associated with attenuator 102. Button 1208 may allow the user to access and/or control power strips to laboratories 104. Buttons 1204 and 1206 may allow the user to read and/or to reset passwords (e.g., administrator password, individual passwords for accessing each laboratory web page, etc.).

Figure 13:
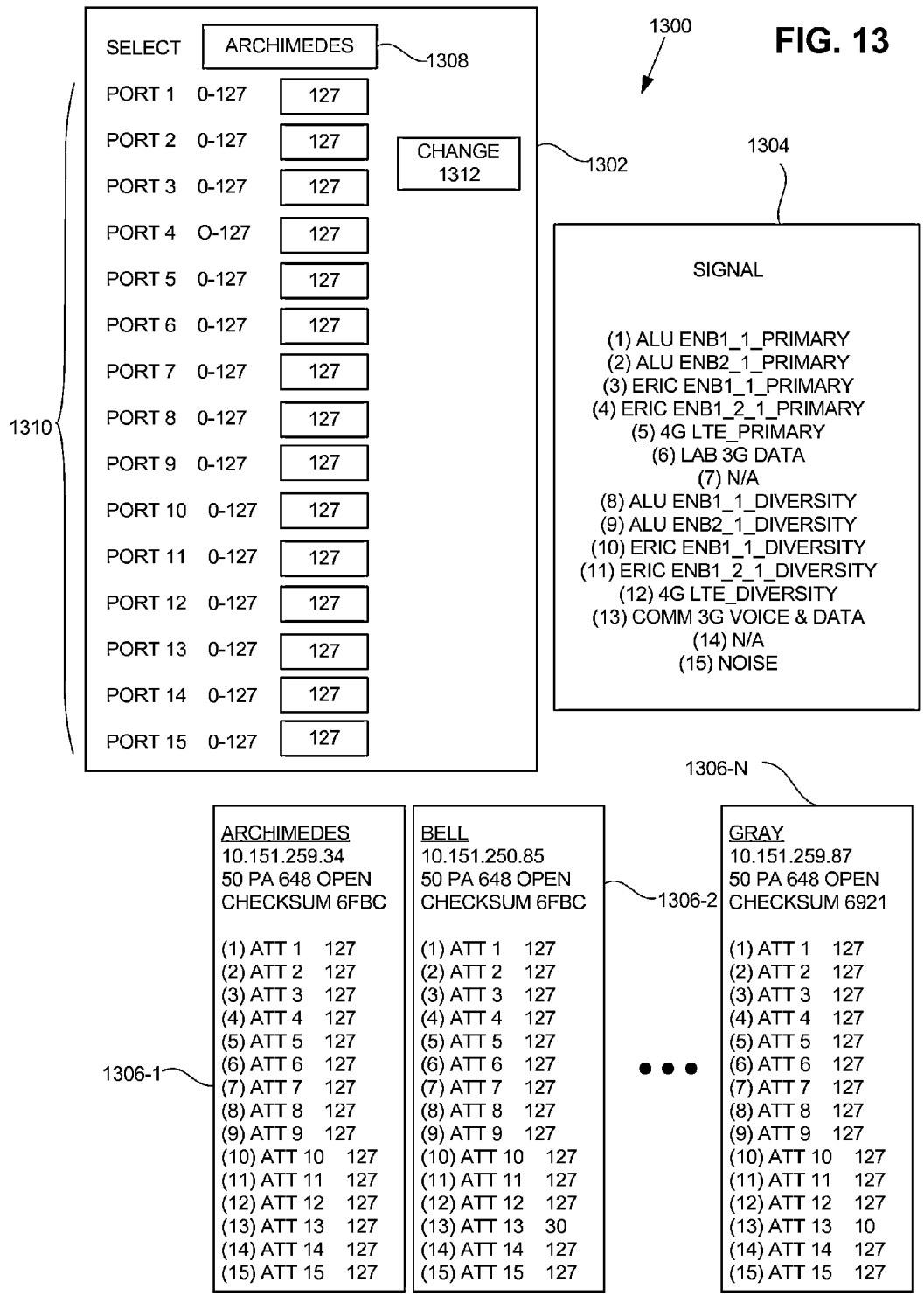
FIG. 13 illustrates a view of the user interface/web pages, displayed by a network device of FIG. 1, for administering attenuation of wireless signals in the system of FIG. 1.

FIG. 13 illustrates a view of a user interface/web pages, displayed by device 106, for administering attenuation of wireless signals in system 100. As shown, attenuation administration web page 1300 may include a default attenuation settings section 1302, ports to base stations map 1304, and attenuation reading sections 1306-1 through 1306-N (collectively "attenuation reading sections 1306" and individually "attenuation reading section 1306"). Depending on the implementation, attenuation administration web page 1300 may include additional, fewer, different, or a different arrangement of components than those illustrated in FIG. 13.

Default attenuation settings section 1302 may include a laboratory selection box 1308, port default settings boxes 1310, and a change button 1312. Laboratory selection box 1308 may allow a user to select a laboratory 104 for which the user wishes to reset default attenuation levels that are associated with base stations of networks 116. Port default settings boxes 1310 may allow, for each port associated with a particular base station of a wireless network 116, a user to set the default attenuation for the laboratory 104 indicated in laboratory selection box 1308. Activating change button 1312 may cause the browser to request server device 112 to change the default settings for attenuator 102 for the selected laboratory, in accordance with the values in default attenuation settings section 1302.

Ports to base stations map 1304 may map each port into attenuator 102 to a base station of wireless network 116. That is, map 1304 may identify, given a port, signals from which base station in which network the port may carry.

Attenuation reading section 1306 may indicate, for a given laboratory 104, default or the current attenuation levels for signals fed by each of the ports listed in ports to base stations map 1304.

FIG. 14 illustrates a view of a user interface/web pages, displayed by device 106, for administration of power strips associated with laboratories 104. As shown, power strip administration page 1400 may include outlet statuses (e.g., "ON" or "OFF") of outlets (e.g., .A1, .A3, .A4, etc.) that feed into laboratories 104 (e.g., "EDISON," DAVINCI," "FRANKLIN," "ARCHIMEDES," "BELL," etc.). Web page 1400 also shows the control state (e.g., "WAKE ON," etc.) of the outlet of the power strips. Depending on the implementation, web page 1400 may include additional components for selecting one or more outlets, resetting the outlet statuses, and changing the control states. In addition, depending on the implementation, web page 1400 may include other information (e.g., power level, harmonics, etc.).

Figure 15:
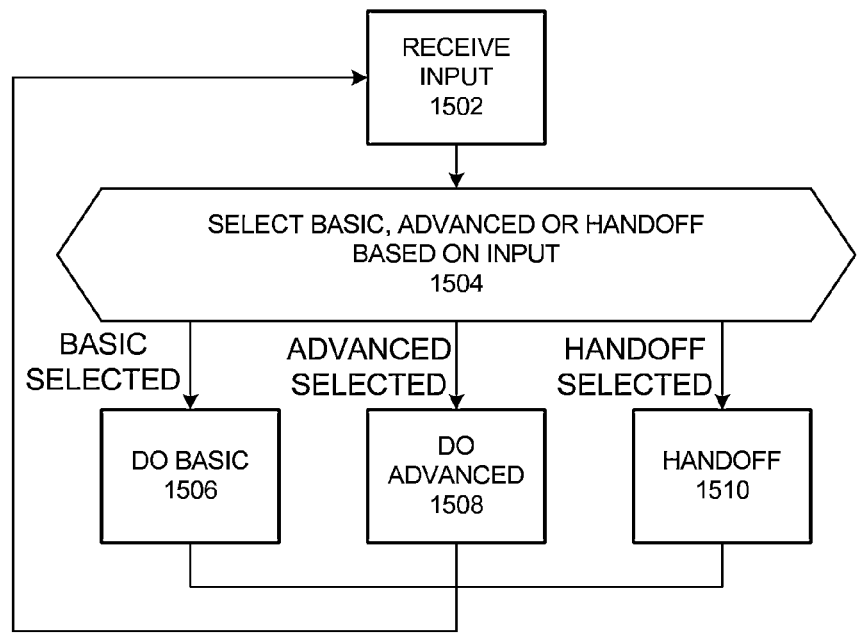
FIG. 15 is a flow diagram of a process that is associated with controlling signals from the wireless networks in the system of FIG. 1.

FIG. 15 is a flow diagram of a process 1500 that is associated with controlling signals from wireless networks 116. As shown, process 1500 may include receiving user input at a particular web page (e.g., page 500), at a given Universal Resource Locator/Identifier (URL/URI).

Depending on the user input, server device 112 may be directed by the browser at device 106 to control attenuation levels of laboratories 104 in one of three modes: basic, advanced, or handoff (block 1504). If the user selects the basic mode, server device 112 and device 106 may perform acts that are associated with setting the attenuation of a signal from a base station in wireless network 116 (block 1506). if the user selects the advanced mode, server device 106 and device 106 may perform acts that are associated with attenuation of multiple signals from one or more base stations in different networks (block 1508). If the user selects the handoff mode, server device 106 and device 106 may perform acts that are associated with emulating handoffs. Once the user/device 106 has finished performing acts that are associated with the basic mode, the advanced more, or the handoff, process 1500 may return to 1502.

As described above, system 100 may allow a user to set attenuation levels of signals from base stations of wireless networks 116, simulate handoffs of user equipment 108 between two wireless networks 116, and obtain information about wireless network subscribers. Accordingly, system 100 allows the user to test user equipment 108 (e.g., a smart phone) under specific network conditions (e.g., signals at specific signal-to-noise ratios).

If a user logs into system 100 as an administrator, the user may set the default attenuation levels, reset passwords for accessing the system (e.g., power distribution units) that feed into specific locations, and/or reset attenuator ports.

In this specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

For example, while a series of blocks has been described with regard to the process illustrated in FIG. 15, the order of the blocks may be modified in other implementations. In addition, non-dependent blocks may represent blocks that can be performed in parallel. Depending on the implementation, process 1500 may also include other blocks/acts not illustrated in FIG. 15.

It will be apparent that aspects described herein may be implemented in many different forms of software, firmware, and hardware in the implementations illustrated in the figures. The actual software code or specialized control hardware used to implement aspects does not limit the invention. Thus, the operation and behavior of the aspects were described without reference to the specific software code—it being understood that software and control hardware can be designed to implement the aspects based on the description herein.

Further, certain portions of the implementations have been described as "logic" that performs one or more functions. This logic may include hardware, such as a processor, a microprocessor, an application specific integrated circuit, or a field programmable gate array, software, or a combination of hardware and software.

No element, block, or instruction used in the present application should be construed as critical or essential to the implementations described herein unless explicitly described as such. Also, as used herein, the article "a" is intended to include one or more items. Further, the phrase "based on" is intended to mean "based, at least in part, on" unless explicitly stated otherwise.

What is claimed is:

1. A method comprising:
    receiving, from a browser, instructions requesting that a first signal from a first base station of a first wireless network be attenuated in accordance with a first attenuation value; and
    setting an attenuation level of the first signal in accordance with the first attenuation value in response to the instructions,
    wherein the first signal attenuated by the first attenuation value is transmitted wirelessly to a first user device shielded from signals transmitted wirelessly to a second user device.

2. The method of claim 1, wherein the instructions further request that a second signal from a second base station of the first wireless network be attenuated in accordance with a second attenuation value, and wherein the method further comprises:
    setting an attenuation level of the second signal in accordance with the second attenuation value in response to the instructions,
    wherein the second signal attenuated by the second attenuation value is transmitted to the first user device.

3. The method of claim 1, wherein the instructions further request that a second signal from a second base station of a second wireless network be attenuated in accordance with a second attenuation value, and wherein the method further comprises:
    setting an attenuation level of the second signal in accordance with the second attenuation value in response to the instructions,
    wherein the second signal attenuated by the second attenuation value is transmitted to the first user device.

4. The method of claim 3, further comprising:
    increasing the attenuation level of the first signal by a first fixed amount at each of first time intervals, and
    decreasing the attenuation level of the second signal by a second fixed amount at each of second time intervals.

5. The method of claim 4, wherein the instructions indicate the first fixed amount and the first time intervals.

6. The method of claim 1, wherein the first wireless network includes one of:
    a long term evolution network (LTE) network;
    a universal mobile telecommunication system (UMTS) network;
    a high-speed packet access (HSPA) network;
    a worldwide interoperability for microwave access network; or
    an Institute of Electrical and Electronics Engineers (IEEE) 802.X network.

7. The method of claim 1, wherein the first user device includes one of:
    a laptop computer; a tablet computer; a personal digital assistant; a gaming device; or a smart phone.

8. The method of claim 1, further comprising:
    receiving a request to change a default attenuation level associated with the first base station; and
    setting the default attenuation level associated with the first base station.

9. The method of claim 1, further comprising;
    receiving a request to change a password for setting the attenuation level of the first signal; and
    changing the password in response to the request.

10. The method of claim 1 further comprising:
    receiving a request to reset a power strip from which a port that feeds the first signal receives power; and
    resetting the power strip in response to the request.

11. A system comprising:
    a first area configured to transmit a first wireless signal, associated with a first base station of a first wireless network, to a first user device at the first area without interference from a second wireless signal transmitted by a second area to a second user device at the second area;
    the second area configured to transmit the second wireless signal, associated with a second base station of a second wireless network, to the second user device at the second area without interference from the first wireless signal transmitted by the first area to the first user device at the first area;

an attenuator configured to:
    attenuate a first signal from the first base station and provide to the first area the attenuated first signal, which is transmitted by the first area as the first wireless signal, and
    attenuate a second signal from the second base station and provide to the second area the attenuated second signal, which is transmitted by the second area as the second wireless signal; and a server device configured to:
    receive from a browser, a message requesting that the first signal from the first base station be attenuated in accordance with a first attenuation value, and
    set an attenuation level of the first signal in accordance with the first attenuation value in response to the message.

12. The system of claim 11, wherein the first wireless network includes one of:
    a long term evolution network (LTE) network;
    a universal mobile telecommunication system (UMTS) network;
    a high-speed packet access (HSPA) network;
    a worldwide interoperability for microwave access network; or
    an Institute of Electrical and Electronics Engineers (IEEE) 802.X network.

13. The system of claim 11, wherein the first user device includes:
    a device compliant with a long term evolution (LTE) standard.

14. The system of claim 11, wherein the message further requests that a third signal from a second base station of the first wireless network be attenuated in accordance with a second attenuation value, and wherein the server device is further configured to:
    set an attenuation level of the third signal in accordance with the second attenuation value in response to the message,
    wherein the third signal attenuated by the second attenuation value by the attenuator is wirelessly transmitted to the first user device by the first area.

15. The system of claim 11, wherein the message further requests that a third signal from the second base station of the second wireless network be attenuated in accordance with a second attenuation value, and wherein the server device is further configured to:
    set an attenuation level of the third signal in accordance with the second attenuation value in response to the message,
    wherein the third signal attenuated by the second attenuation value by the attenuator is wirelessly transmitted to the first user device by the first area.

16. The system of claim 15, wherein the server device is further configured to:
    increase the attenuation level of the first signal by a first fixed amount at each of first time intervals, and
    decrease the attenuation level of the third signal by a second fixed amount at each of second time intervals.

17. The system of claim 15, wherein the server device is further configured to request the attenuator to:
    increase the attenuation level of the first signal by a first fixed amount at each of first time intervals, and
    decrease the attenuation level of the third signal by a second fixed amount at each of second time intervals.

18. The system of claim 11, wherein the first user device includes the browser.

19. The system of claim 11, wherein the server device is further configured to:
    receive a request to reset a power strip from which a port that feeds the first signal receives power; and
    reset the power strip in response to the request.

20. A non-transitory computer-readable medium, comprising computer-executable instructions that, when executed by at least one processor, cause the at least one processor to:
    receive, from a browser, a message requesting that a first signal from a first base station of a first wireless network be attenuated in accordance with a first attenuation value; and
    set an attenuation level of the first signal in accordance with the first attenuation value in response to the message,
    wherein the first signal attenuated by the first attenuation value is transmitted to a first user device at a first area shielded from wireless signals transmitted to a second user device at a second location.

* * * * *